United States Patent
Chu et al.

(10) Patent No.: US 9,208,109 B2
(45) Date of Patent: Dec. 8, 2015

(54) MEMORY CONTROLLERS WITH DYNAMIC PORT PRIORITY ASSIGNMENT CAPABILITIES

(75) Inventors: Michael H. M. Chu, Fremont, CA (US); Jeffrey Schulz, Milpitas, CA (US); Chiakang Sung, Milpitas, CA (US); Ravish Kapasi, Fremont, CA (US)

(73) Assignee: Altera Corporation, San Jose, CA (US)

( * ) Notice: Subject to any disclaimer, the term of this patent is extended or adjusted under 35 U.S.C. 154(b) by 283 days.

(21) Appl. No.: 13/151,101

(22) Filed: Jun. 1, 2011

(65) Prior Publication Data

US 2012/0311277 A1    Dec. 6, 2012

(51) Int. Cl.
  G06F 12/08   (2006.01)
  G06F 13/16   (2006.01)
  G06F 13/18   (2006.01)

(52) U.S. Cl.
  CPC ............ *G06F 13/1626* (2013.01); *G06F 13/16* (2013.01); *G06F 13/1605* (2013.01); *G06F 13/18* (2013.01)

(58) Field of Classification Search
  CPC . G06F 12/00; G06F 12/0623; G06F 13/1626; G06F 13/18; G06F 3/061; G06F 2209/5021
  USPC .............. 711/158, E12.001, 154, 105, 151, 711/E12.016, 149; 718/103, 102; 710/113, 710/114, 316, 244
  See application file for complete search history.

(56) References Cited

U.S. PATENT DOCUMENTS

| | | | |
|---|---|---|---|
| 4,006,466 A | 2/1977 | Patterson | |
| 4,488,218 A * | 12/1984 | Grimes | 710/116 |
| 4,493,036 A | 1/1985 | Boudreau | |
| 4,814,974 A | 3/1989 | Narayanan | |
| 5,025,370 A * | 6/1991 | Koegel et al. | 710/241 |
| 5,163,152 A * | 11/1992 | Okamoto | 710/260 |
| 5,420,985 A * | 5/1995 | Cantrell et al. | 710/113 |
| 5,754,800 A | 5/1998 | Lentz | |
| 5,832,304 A | 11/1998 | Bauman | |
| 6,253,262 B1 * | 6/2001 | Rozario et al. | 710/39 |
| 6,563,506 B1 * | 5/2003 | Wang | 345/535 |
| 6,661,733 B1 * | 12/2003 | Pan et al. | 365/230.05 |
| 6,810,038 B1 * | 10/2004 | Isoyama et al. | 370/395.42 |
| 7,463,057 B1 * | 12/2008 | Rahim et al. | 326/38 |
| 7,475,315 B1 * | 1/2009 | Natarajan et al. | 714/733 |
| 7,589,556 B1 * | 9/2009 | Tan et al. | 326/40 |
| 7,920,410 B1 * | 4/2011 | Lee et al. | 365/154 |
| 8,392,661 B1 * | 3/2013 | Metcalf | 711/133 |

(Continued)

*Primary Examiner* — Sanjiv Shah
*Assistant Examiner* — Edward Waddy, Jr.
(74) *Attorney, Agent, or Firm* — Treyz Law Group; Jason Tsai

(57) ABSTRACT

A programmable integrated circuit may have a memory controller that interfaces between master modules and system memory. The memory controller may receive memory access requests from the masters via ports that have associated priority values and fulfill the memory access requests by configuring system memory to respond to the memory access requests. To dynamically modify the associated priority values while the memory controller receives and fulfills the memory access requests, a priority value update module may be provided that dynamically updates priority values for the memory controller ports. The priority value update module may provide the updated priority values with update registers that are updated based on an update signal and a system clock. The priority values may be provided by shift registers, memory mapped registers, or provided by masters along with each memory access request.

16 Claims, 10 Drawing Sheets

(56) References Cited

U.S. PATENT DOCUMENTS

| | | |
|---|---|---|
| 2002/0129199 A1* | 9/2002 | Srinivasan et al. ............ 711/108 |
| 2003/0033584 A1* | 2/2003 | Zaveri et al. .................... 716/17 |
| 2003/0177297 A1* | 9/2003 | Hesse et al. ................... 710/305 |
| 2004/0064615 A1 | 4/2004 | Hammitt |
| 2004/0117527 A1* | 6/2004 | Takata ........................... 710/111 |
| 2004/0156323 A1* | 8/2004 | Cao ............................... 370/258 |
| 2007/0113106 A1* | 5/2007 | Liu et al. ....................... 713/300 |
| 2007/0136503 A1 | 6/2007 | Worrell et al. |
| 2007/0205802 A1* | 9/2007 | Perisetty ......................... 326/27 |
| 2009/0043920 A1 | 2/2009 | Kuris et al. |
| 2009/0243687 A1* | 10/2009 | Lewis et al. ................... 327/224 |
| 2009/0248935 A1* | 10/2009 | Ehrlich et al. ................ 710/264 |
| 2009/0248999 A1* | 10/2009 | Kusachi ........................ 711/158 |
| 2010/0161918 A1* | 6/2010 | Norman ........................ 711/158 |
| 2010/0312935 A1* | 12/2010 | Higuchi ........................ 710/112 |
| 2011/0197038 A1* | 8/2011 | Henriksson et al. .......... 711/158 |
| 2011/0302356 A1* | 12/2011 | Helton .......................... 711/103 |

* cited by examiner

MEMORY CONTROLLERS WITH DYNAMIC PORT PRIORITY ASSIGNMENT CAPABILITIES

BACKGROUND

Programmable integrated circuits are a type of integrated circuit that can be configured by a user to implement custom logic functions. In a typical scenario, a logic designer uses computer-aided design (CAD) tools to design a custom logic circuit. When the design process is complete, the CAD tools generate configuration data. The configuration data is loaded into a programmable integrated circuit to configure the device to perform desired logic functions.

In a typical system, a programmable integrated circuit can be used to communicate with system memory. This type of programmable integrated circuit often includes a memory controller that serves as an interface between the programmable integrated circuit and system memory. The programmable integrated circuit also includes modules configured to access system memory by sending memory access requests to the memory controller (e.g., the memory controller includes multiple ports each of which receives memory access requests from a respective module within the programmable integrated circuit).

Each port of the memory controller is assigned a corresponding priority value. The memory controller uses the port priority values to determine the order in which to execute the memory access requests received from the different modules (i.e., to determine which memory access requests are prioritized over other memory access requests). The port priority values of conventional memory controllers in programmable integrated circuits are assigned with predetermined port priority values that cannot be modified while the memory controller is receiving and fulfilling memory access requests.

SUMMARY

An integrated circuit such as a programmable integrated circuit may be used to communicate with system memory. The programmable integrated circuit includes reconfigurable circuitry that may be configured to form multiple modules each of which is operable to perform tasks that require access to system memory. The programmable integrated circuit may also include a memory controller that serves as an interface between the different modules and system memory. The various modules may be coupled to the memory controller and may sometimes be referred to herein as "master" processing modules.

The memory controller may receive memory access requests from the master processing modules via ports that have associated priority values. The memory controller may fulfill the memory access requests by configuring system memory to respond to the memory access requests (e.g., by performing desired read/write operations). The programmable integrated circuit may be provided with a priority value update module (sometimes referred to as port priority updating circuitry) configured to dynamically modify the priority values associated with each memory controller port while the memory controller receives and fulfills the memory access requests. The priority value update module may provide new priority values for the different memory ports in response to asserting an update signal and detecting a system clock rising edge (as an example).

The new priority values may be provided by various sources to the priority value update module. For example, the priority values may be provided by shift registers, by memory mapped registers, or by a master processing module along with a memory access request. The priority value update module may receive a priority address signal and other control signals and may be used to selectively route the new priority values from the desired source to a corresponding memory controller port based on the values of the priority address and control signals.

Further features of the present invention, its nature and various advantages will be more apparent from the accompanying drawings and the following detailed description.

DETAILED DESCRIPTION

Figure 1:
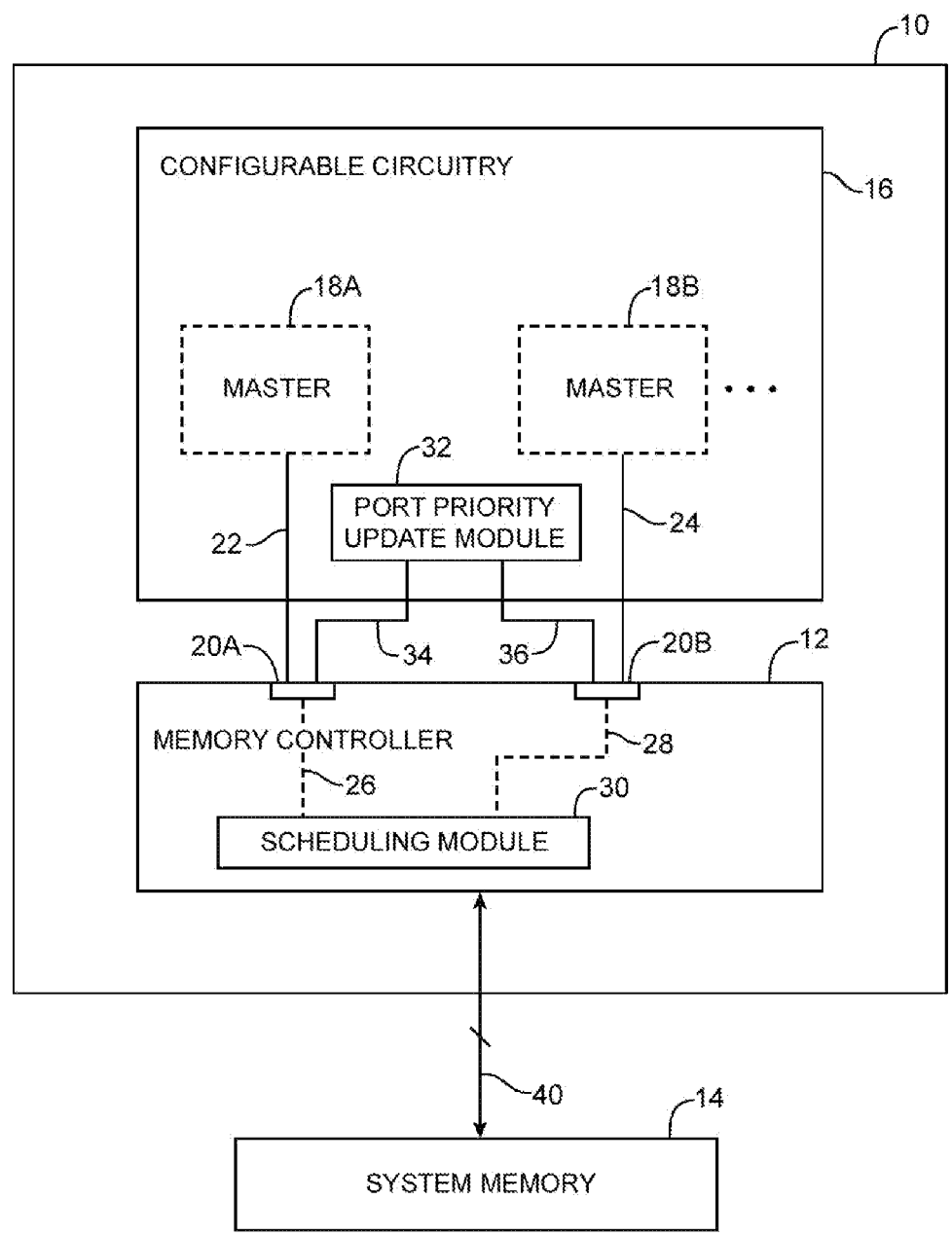
FIG. 1 is a diagram of an illustrative programmable integrated circuit operable to communicate with system memory in accordance with an embodiment of the present invention.

Embodiments of the present invention relate to integrated circuits that contain memory controllers. Integrated circuits such as programmable integrated circuits may include reconfigurable circuitry (sometimes referred to herein as soft fabric). Users may configure the reconfigurable circuitry to form processing modules such as general purpose processing modules or processing modules that perform specific tasks. Processing modules may perform tasks that require access to system memory (e.g., to store data for later retrieval).

Integrated circuits such as programmable integrated circuits use programmable memory elements to store configuration data. During the programming of a programmable integrated circuit, configuration data is loaded into the memory elements. During operation of the programmable integrated circuit, each memory element provides a static output signal. The static output signals that are supplied by the memory elements serve as control signals. These control signals are applied to programmable logic on the integrated circuit to customize the programmable logic to perform a desired logic function.

Programmable integrated circuits may be provided with memory controllers that serve as interfaces between the processing modules and system memory. The memory controllers used in integrated circuits may be formed from non-reconfigurable logic (sometimes referred to as "hard" memory controllers, "hardwired" memory controllers, or "non-programmable" memory controllers). Hard memory controllers may provide improved performance over memory controllers formed from reconfigurable logic (sometimes referred to as "soft" logic).

Each processing module that communicates with the memory controller may sometimes be referred to as a "master" processing module (or master). The memory controller may have ports coupled to respective master processing modules.

A master processing module may send an access request to the memory controller when the master processing module needs to access system memory. For example, a master processing module may send a read access request to the memory controller to retrieve data from memory. The memory controller may receive the read access request and fulfill the read access request by providing control signals to system memory (e.g., the memory controller may receive the read access request and provide control signals to system memory that configure system memory to respond with the requested data). As another example, the master processing module may send a write access request to the memory controller along with corresponding write data to be loaded into system memory. The memory controller may receive the write access request and fulfill the write access request by configuring system memory to overwrite system memory at the specified address.

Due to limitations of system memory, the memory controller can only fulfill a limited number of access requests within a given time period. For example, system memory may be formed from several memory banks (e.g., 4 or 8 memory banks). At any given time, each memory bank may be configured to fulfill only one memory access request (i.e., a second memory access request following a first memory access request to a memory bank may be delayed until the memory controller has finished fulfilling the first memory access request).

Each of the master processing modules may send a number of memory access requests to a corresponding port in the memory controller. Due to the limitations of system memory, the memory access requests from the master processing modules are processed in a sequential order. In order to process large numbers of memory access requests, the memory controller may be provided with a scheduling circuit (sometimes referred to as a scheduler) that receives memory access requests in parallel from the master processing modules and arranges the memory access requests in a desired order for serial processing (i.e., a desired order in which to fulfill the memory access requests from the masters).

It may be desirable to prioritize the memory access requests from at least some of the master processing modules. For example, a first master may be a general purpose processing circuit (e.g., a portion of configurable circuitry that is configured to perform general purpose processing tasks) that sends read access requests to retrieve program instruction code data from memory. A second master may be a secondary processing circuit that receives instructions from the general purpose processing circuit (e.g., the second master may be a digital signal processing circuit that decodes video data in response to receiving instructions from the general purpose processing circuit). In this example, it may be desirable to prioritize the memory access requests from the first master (i.e., the general purpose processing circuit) over the second master (i.e., the digital signal processing circuit), because the second master performs functions that are supplemental to the first master. An arbitrating unit such as a scheduler may be used to fulfill memory access requests from a master assigned with a higher priority value before fulfilling memory access request from a master assigned with a lower priority value.

Memory controllers formed from non-reconfigurable logic (i.e., "hard" memory controllers) have port priorities that are hardwired to the memory controller (i.e., the port priorities may be predetermined before normal operation of the "hard" memory controller). It may be desirable to provide "hard" memory controllers in programmable integrated circuits with dynamic port priority assignment capabilities. For example, a first master may initially be assigned a priority that is lower than the priority of a second master. The tasks performed by the first master may change (e.g., the first master may be configured to perform functions that are more sensitive to delays and require a higher priority than the functions initially performed by the first master). In such scenarios, it may be desirable to increase the priority with which memory access requests from the first master are fulfilled (e.g., by providing the first master with a priority higher than the priority of the second master).

Programmable logic integrated circuit 10 is shown in FIG. 1 that includes a memory controller 12 and a priority value update module 32 that supports dynamic updating of memory port priorities. Priority value update module 32 may be formed from "soft" fabric (e.g., reconfigurable logic). Memory controller 12 may serve as an interface between integrated circuit 10 and system memory 14. System memory 14 may be formed from double data rate synchronous dynamic random access memory (e.g., DDR1, DDR2, and DDR3 SDRAM) or other suitable types of memory. Memory controller 12 may be coupled to system memory 14 via path 40.

Programmable logic integrated circuit 10 may use memory controller 12 to communicate with system memory 14 by providing memory controller 12 with read access requests and write access requests. Memory controller 12 may fulfill the memory access requests by configuring system memory 14 to respond to the memory access requests. For example, device 10 may provide memory controller 12 with a read access request to read a word of data from a desired address within system memory 14. In response to receiving the read request, memory controller 12 may process the request, generate corresponding control signals, and convey the control signals to system memory 14 via path 40. The control signals (e.g., system clock, memory address, and command signals) generated by memory controller 12 may configure system memory 14 to reply with data stored at the desired address. As another example, device 10 may provide memory controller 12 with a write access request to write a word of data to a desired address in system memory 14. In response to receiving the write request, memory controller 12 may generate and convey control signals (e.g., signals that configure system memory 14 to store the word of data at the desired address) to system memory 14 via path 40.

Programmable logic integrated circuit 10 may contain configurable circuitry such as configurable circuitry 16. Configurable circuitry 16 may be configured to form multiple processing modules that perform various tasks. For example, a first module 18A may be configured to perform general purpose tasks (e.g., module 18A may be configured as a general purpose processing module) and a second module 18B may be configured to perform other tasks (e.g., module 18B may be configured to perform video decoding tasks). Modules 18 (e.g., modules 18A and 18B) may require access to system memory 14 when performing certain tasks. For example, to complete video decoding tasks, module 18B may read and store data from specified addresses in system memory 14.

Modules 18 may be coupled to respective ports 20 in memory controller 12. For example, module 18A may be coupled to port 20A, whereas module 18B may be coupled to port 20B. Modules 18A and 18B that are respectively coupled to memory controller ports 20 (e.g., memory controller ports 20A and 20B) may be referred to herein as master processing modules or simply "masters." The example of FIG. 1 having two processing modules is merely illustrative and is not intended to limit the scope of the present invention. If desired, zero master modules, three or more master modules, ten or more master modules, or other processing circuitry that requires access to system memory 14 may be formed using configurable circuitry 14. Additionally, the example of FIG. 1 illustrates masters 18 formed from programmable logic, but in other embodiments, the masters may be formed from hardened logic, for example as can be found in an ASIC.

There may be many master processing modules that require access to system memory 14 via memory controller 12. These masters may generate memory access requests and convey the memory access requests to memory controller 12. Memory controller 12 can fulfill only a limited number of the memory access requests that it receives. For example, due to limitations specified by a memory interface protocol currently under use, memory controller 12 may only be able to configure system memory 14 to fulfill one memory access request at a time (e.g., memory access requests from masters 18A and 18B cannot be fulfilled simultaneously even if masters 18B and 18B send the request to memory controller 12 in parallel).

It may be desirable to prioritize the memory access requests associated with one master processing module relative to the memory access requests associated with another master processing module. For example, tasks performed by master processing module 18B may be more time sensitive than tasks performed by master processing module 18A. In this scenario, the memory access requests associated with master 18B may be fulfilled before the memory access requests associated with master 18A even if the memory access requests from master 18A were provided to memory controller 12 before the memory access requests from master 18B. To accommodate memory access requests associated with multiple master processing modules each assigned with a respective priority level, memory controller 12 may include a scheduling module 30.

Scheduling module 30 may receive memory access requests from each master module via respective paths (e.g., scheduler 30 may have a first terminal that is coupled to master 18A and a second terminal that is coupled to master 18B). Each memory access request may include information regarding the type of memory access request (e.g., a read access request, write access request, etc.), data associated with the memory access request (e.g., write data to be stored in system memory 14), address data (e.g., a system memory address corresponding to a location in system memory 14 at which to read or write data), or other desirable information associated with the memory access request.

Each master processing module may be assigned a corresponding priority value that represents the priority with which memory access requests from that master processing module should be fulfilled. For example, master processing module 18A may be assigned a priority value of "0", whereas master 18B may be assigned a priority value of "1." The priority values may be represented using binary encoding. For example, if device 10 is configured with four master processing modules, at least two bits are required to uniquely identify each of the master processing modules, whereas if the device 10 is configured with eight master processing modules, at least three bits are required to uniquely identify all of the master processing modules.

Consider a scenario in which the priority levels are encoded using a three-bit signal. The priority levels may, for example, include values from zero to seven (e.g., "000," "001," "010," "011," "100," "101," "110," and "111"). The priority value may be inversely proportional to the priority with which memory access requests are fulfilled. For example, a first master processing module with a priority value of "1" has a higher priority than a second master processing module with a priority value of 5 (e.g., memory access requests from the first master processing module may be fulfilled before memory access requests from the second master processing module).

Figure 2:
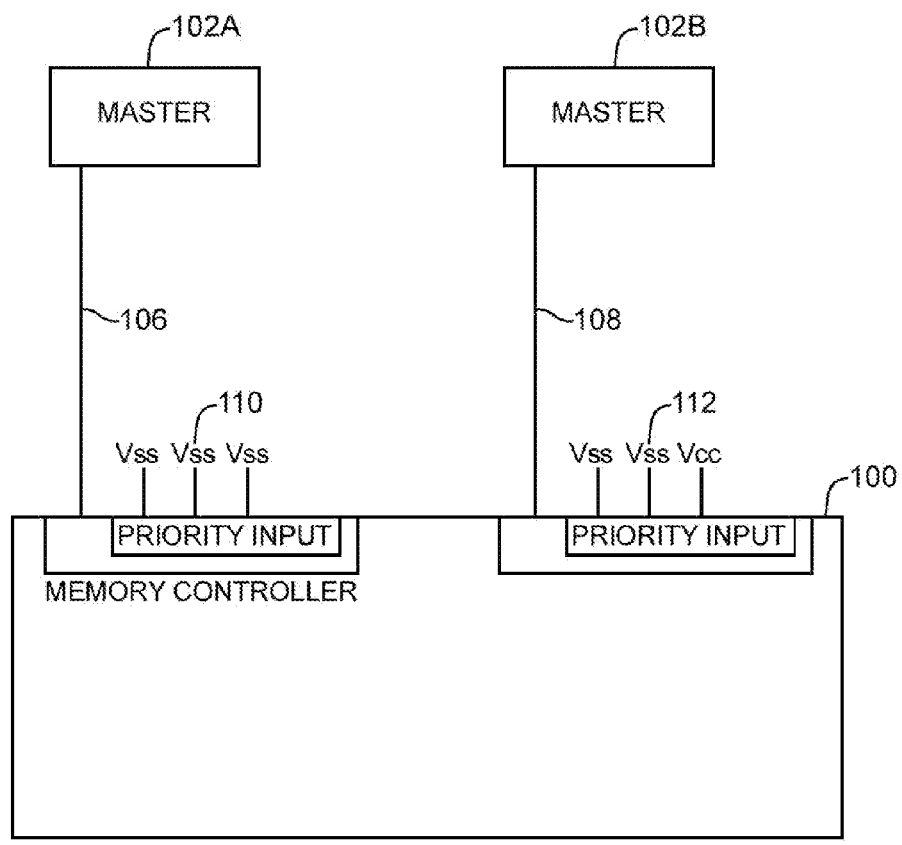
FIG. 2 is a diagram of a conventional memory controller configured to receive fixed port priority values.

Conventional memory controllers used in programmable integrated circuits assign a predetermined priority to each port of the memory controller (i.e., a conventional memory controller includes a scheduler that receives fixed priority values). As shown in FIG. 2, conventional memory controller 100 is coupled to master 102A and 102B via paths 106 and 108, respectively, and has a first set of priority inputs 110 associated with master 102A and a second set of priority inputs 112 associated with master 102B. Inputs 110 are configured to receive priority values for master 102A, whereas inputs 112 are configured to receive priority values for master 102B. Inputs 110 and 112 are therefore sometimes referred to as priority value input terminals. To assign a priority value of zero to master 102A, scheduler 100 is provided with supply voltage signals Vss (i.e., a ground power supply voltage), Vss, and Vss to inputs 110. To assign a priority value of one to master 102B, scheduler 100 is provided with supply voltage signals Vss, Vss, and Vcc (i.e., a positive power supply voltage) at inputs 112. Hardwiring inputs 110 and 112 to power supply rails or preset registers in this way does now allow the priority values to be changed while the memory controller is being used to fulfill memory access requests.

To provide device 10 with the capability of adjusting the priority values for each master 18 (e.g., masters 18A and 18B) without powering down memory controller 12, priority value update module 32 may be coupled to memory controller 12 via paths 34 and 36 as shown in FIG. 1. Path 34 may be coupled to port 20A and path 36 may be coupled to port 20B. Priority value update module 32 may provide priority values to memory controller 12 for ports 20A and 20B via paths 34 and 36.

Figure 3:
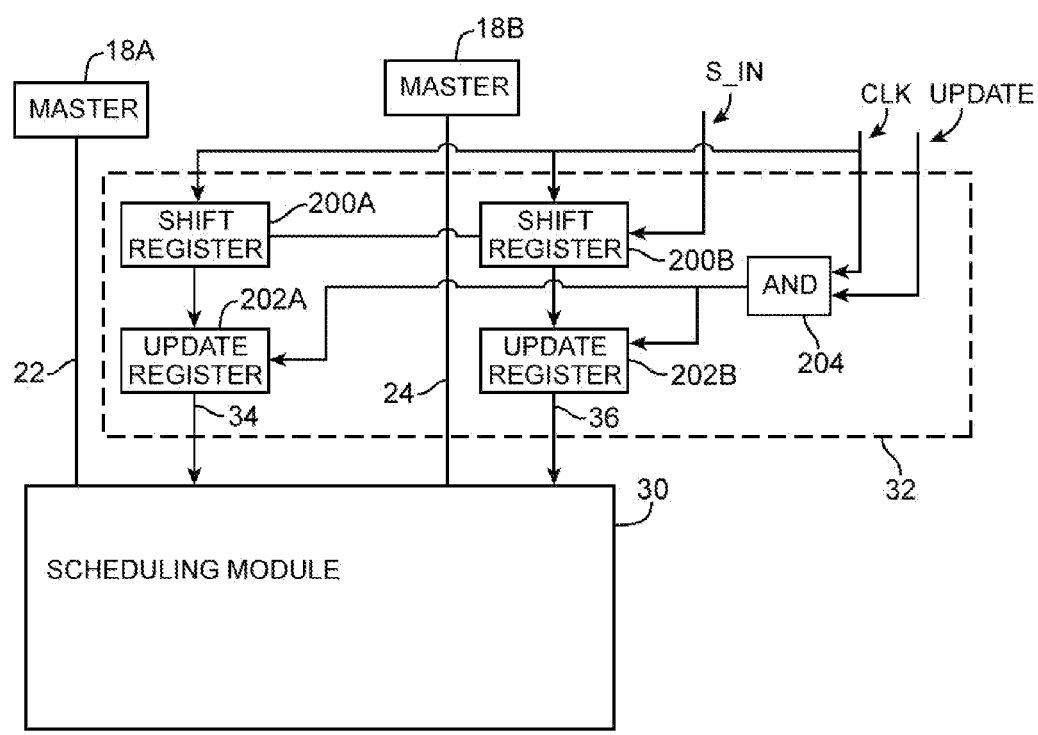
FIG. 3 is a diagram of port priority updating circuitry configured to receive priority values provided using shift registers in accordance with an embodiment of the present invention.

In one embodiment, priority value update module 32 may contain shift registers. As shown in FIG. 3, a shift register and an update register may be formed for each master processing module. For example, master 18A may have a corresponding shift register 200A and an update register 202A and master 18B may have a corresponding shift register 200B and an update register 202B. As in our example from FIG. 3, the update registers 202A and 202B provide the priority values to the scheduling module 30 via paths 34 and 36. Scheduling module 200 may receive memory access requests from many masters, each with corresponding shift registers and update registers (e.g., shift registers and update registers that are associated with the ports to which the masters provide memory access requests).

To provide priority values associated with each master, shift registers 200 (e.g., shift registers 200A and 200B) may be loaded in a serial fashion via serial data path S_in. For example, to load shift register 200A with priority value "0" (i.e., binary value "000") and shift register 200B with priority value "1" (i.e., binary value "001"), the input sequence "000001" may be conveyed through data path S_in. In this case, the first three bits of the input sequence may correspond to the priority value "0," whereas the final three bits of the input sequence may correspond to the priority value "1."

Shift registers 200 (e.g., shift registers 200A and 200B) may be loaded in a synchronous fashion by controlling the shift register with a system clock CLK (e.g., a system clock CLK associated with memory controller 12). At the start of each period of the system clock, an input bit provided on input path S_in may be shifted into shift registers 200. In this way, priority values may be assigned to all of the masters in a number of clock cycles equal to the total number of bits of the priority values.

Each shift register may be coupled to a corresponding update register (e.g., the outputs of each shift register may be coupled to the inputs of a corresponding update register). The output of the update register may be coupled to priority value inputs of scheduling module 30. To synchronously provide the priority values contained in each shift register 200 to scheduling module 30, the update registers 202 may be enabled using the system clock, CLK, and an update signal, UPDATE. For example, the update register may be enabled when the signals CLK and UPDATE are both asserted. System clock CLK may have a frequency equal to the operational frequency of memory controller 12.

Providing an update register 202A interposed between each shift register 200A and scheduling module 30 may allow users to update priority values in a serial fashion without disabling or powering down schedule module 30. For example, to update the priority value associated with master 18A, a new priority value may be serially shifted into shift register 200A through serial path S_in. When the new priority value has been shifted into shift register 200A, update register 202A that provides the priority value associated with master 18A may be updated at the next system clock (CLK) cycle with the new priority value by assertion of the update signal (i.e., the new priority value may be provided to memory controller 12 at the system clock cycle after the assertion of the update signal).

By synchronizing the update signal with system clock CLK (e.g., a system clock CLK that has an operational frequency equal to the operational frequency of memory controller 12), glitches associated with updating priority values may be prevented. For example, memory controller 12 may be formed from non-programmable logic and operate with a clock frequency greater than a clock frequency of configurable circuitry 16. In this scenario, the update signal may be provided to update registers 202 by configurable circuitry 16 and glitches due to the difference in operational clock frequencies between memory controller 12 and configurable circuitry 16 may be prevented by synchronizing the update signal with system clock CLK.

Figure 4:
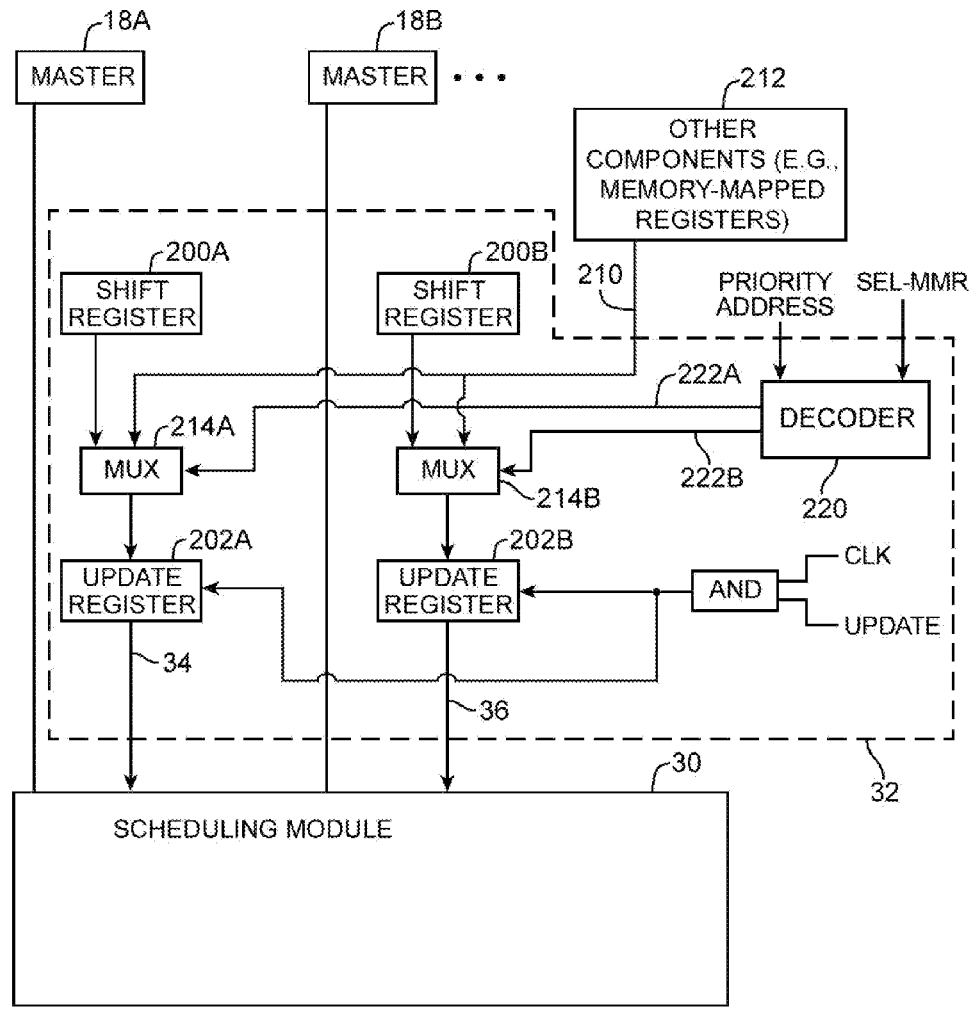
FIG. 4 is a diagram of port priority updating circuitry configured to receive priority values provided using shift registers and memory mapped registers in accordance with an embodiment of the present invention.

If desired, priority values may be provided by a user in parallel fashion to priority value update module 32. In the diagram of FIG. 4, priority values may be provided in parallel to update registers 202A through multiplexers 214 and data path 210. Priority values may be provided from other components 212 of integrated circuit 10 (e.g., memory mapped registers, a device located on a bus interface, or other desirable storage components).

Data path 210 may be coupled to each multiplexer 214 (e.g., multiplexer 214A and multiplexer 214B) and provide a single priority value to all multiplexers 214 at any given time (e.g., all of the data bits corresponding to a single priority value). Data path 210 may be a parallel data bus or other data paths suitable for providing data bits in parallel. To update a given update register (e.g., update register 202A associated with master 18A) with the priority value provided by components 212, a SEL_MMR signal and a priority address may be provided. The priority address may identify the update register of interest and the SEL_MMR signal may identify that the priority value is provided by components 212 to the update register of interest. The decoder may receive the priority address and SEL_MMR signal and provide appropriate control signals to multiplexers 214 via paths 222. The control signals may direct a desired multiplexer to route the priority value provided by components 212 to a desired update register.

For example, to update the priority value associated with master 18A, components 212 (e.g., a memory mapped register) may provide a new priority value and the system may provide a priority address (e.g., priority address "1" that corresponds to master 18A and update register 202A) to decoder 220. The decoder may receive the priority address and identify that update register 202A corresponds to the received priority address (e.g., by decoding the bits of the priority address). In response to identifying update register 202A, decoder 220 may transmit a control signal to multiplexer 214A via path 222A that routes the new priority value from components 212 to update register 202A. The system may provide an update signal to update registers 202. In this scenario, only update register 202A may be updated with the priority value provided by components 212.

In this way, a single priority value associated with a master may be updated in a single clock cycle. The number of system clock cycles required to update all of the masters 18 in this parallel fashion may correspond to the number of masters. For example, priority address "1" may correspond to update register 18A and priority address 0 may correspond to update register 18B. To update the priority values for master 18A, priority address 1 may be provided to decoder 220 and a first update signal may be provided to the update registers. At the next assertion of the system clock signal (e.g., at the start of the next system clock cycle), update register 18A may be updated with a first priority value provided on path 210 (e.g., from memory mapped registers 212). To update the priority values for master 18B, priority address "0" may be provided to decoder 220 and a second update signal may be provided to the update registers (e.g., during the system clock cycle when update register 18A is updated). At the next assertion of the system clock signal (e.g., at the start of the system clock cycle following the system clock cycle when update register 18A was updated), update register 18B may be updated with a second priority value provided on path 210. In this scenario, two system clock cycles may be required to update the priority values of master 18A and master 18B.

The use of multiplexers 214 may allow priority values to be provided from various sources. As shown in FIG. 4, multiplexer 214A may be provided with priority values from a first shift register (e.g., shift register 200A from the arrangement of FIG. 3) and from components 212. Multiplexer 214B may be provided with priority values from a second shift register (e.g., shift register 200B from the arrangement of FIG. 3) and from components 212. To select between the various sources, decoder 220 may be provided with control signals such as the SEL_MMR signal in addition to the priority address signal. In the example of FIG. 4, when the SEL_MMR signal is asserted and a priority address is provided, decoder 212 may direct the multiplexer corresponding to the provided priority address to select a priority value from components 212. In this case, the decoder may direct all other multiplexers to select priority values from corresponding shift registers (e.g., if SEL_MMR is asserted and a priority address "1" is provided that corresponds to update register 202A, multiplexer 214A may be directed to route a priority value provided from components 212 and multiplexer 214B may be directed to route a priority value provided from a shift register).

The decoder may direct multiplexers other than the multiplexer identified by a priority address provided to the decoder (i.e., each non-identified multiplexer) to select any priority value source. The sources selected by each non-identified multiplexer may reflect sources that provide default priority values whenever an update signal is asserted. In this way, the update registers that are not identified by a priority address may retain default priority values when an update signal is asserted. For example, it may be desirable to provide the port associated with master 18B with the default priority value "2" stored in an associated shift register 200B. To provide master 18B with a default priority value of 2, decoder 220 may direct multiplexer 214B to select the priority value from shift register 200B whenever a priority address that does not correspond to multiplexer 214B is provided to decoder 220 (e.g., if decoder 220 receives a priority address "1" that does not correspond to mux 214B, decoder 220 may configure mux 214B to select the default priority value stored in shift register 200B). While the embodiment in FIG. 4 shows updating the priority value for a single master through an addressing scheme, other methods for parallel loading of the priority values will be apparent to one of skill in the art. These alternatives may include a simultaneous loading of all shift registers 200 and latching or muxing them into update registers 202, or may include other addressing schemes for loading a priority value into an individual update register 202.

Figure 5:
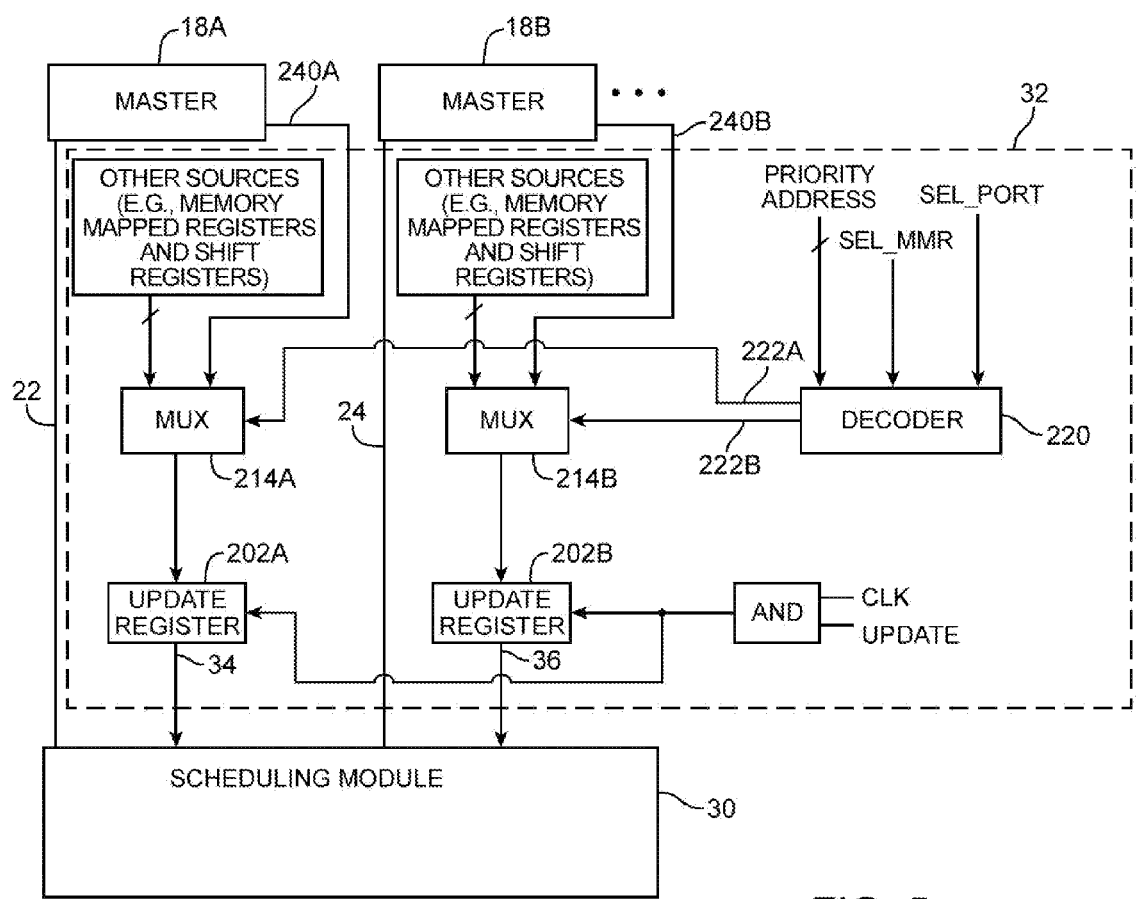
FIG. 5 is a diagram of port priority updating circuitry configured to receive priority values provided using shift registers, memory mapped registers, and an associated processing module in accordance with an embodiment of the present invention.

In another embodiment, it may be desirable to dynamically update priority values for each memory access request. For example, master 18A and master 18B may each dynamically determine their respective priority values (e.g., master 18A may determine its priority value based on how time-sensitive its memory access requests are). To dynamically update priority values, each master may provide priority values that correspond with respective memory access requests. FIG. 5 shows an arrangement in which each master 18 may provide a priority value to priority value update module 32 for a corresponding memory access request.

As shown in FIG. 5, each master may be coupled to a corresponding multiplexer 214. For example, master 18A may be coupled to multiplexer 214A via path 240A and master 18B may be coupled to multiplexer 214B via path 240B. Each multiplexer 214 may be provided priority values from a corresponding master and other sources such as shift register 200 from FIG. 3 and components 212 of FIG. 4. Each master 18 may provide priority values associated with the master to a corresponding multiplexer 214 via a corresponding path 240.

As an example, master 18A may provide time-sensitive memory access requests (e.g., read access requests to read program instructions from system memory). Master 18A may be initially assigned a relatively low priority (e.g., a priority value of 10). Master 18A may desire the time-sensitive memory access requests to be fulfilled with a relatively high priority (e.g., a priority value of 1). Master 18A may convey the desired priority value of 1 to multiplexer 214A via path 240A during or before the time at which the delay-sensitive memory access requests are provided to scheduling module 30 via path 22.

Decoder 220 may be provided with a priority address that identifies a multiplexer 214 of interest, a SEL_PORT signal that identifies whether or not multiplexer 214 should be configured to route a priority value provided by an associated master 18 through the multiplexer, and a SEL_MMR signal that identifies whether or not the multiplexer should be configured to route a priority value provided by other sources such as components 212 (not shown). For example, decoder 220 may be provided with a priority address "1" that corresponds to multiplexer 214A and an asserted SEL_PORT signal. In response to receiving the priority address and the SEL_PORT signal, decoder 220 may configure multiplexer 214A to pass a priority value provided by master 18A on path 240A to update register 202A.

The SEL_PORT signal may be asserted based on which master 18 that scheduling module 30 is currently receiving a memory access request from. For example, the SEL_PORT signal may be asserted (and a priority address that selects an appropriate multiplexer 214) when master 18B provides a memory access request to scheduling module 30. By asserting the SEL_PORT signal based on which master 18 is providing memory access requests, the priority value associated with each master may be dynamically updated with each provided memory access request (e.g., the SEL_PORT signal may be asserted whenever a master provides a memory access request and a priority value).

Figure 6:
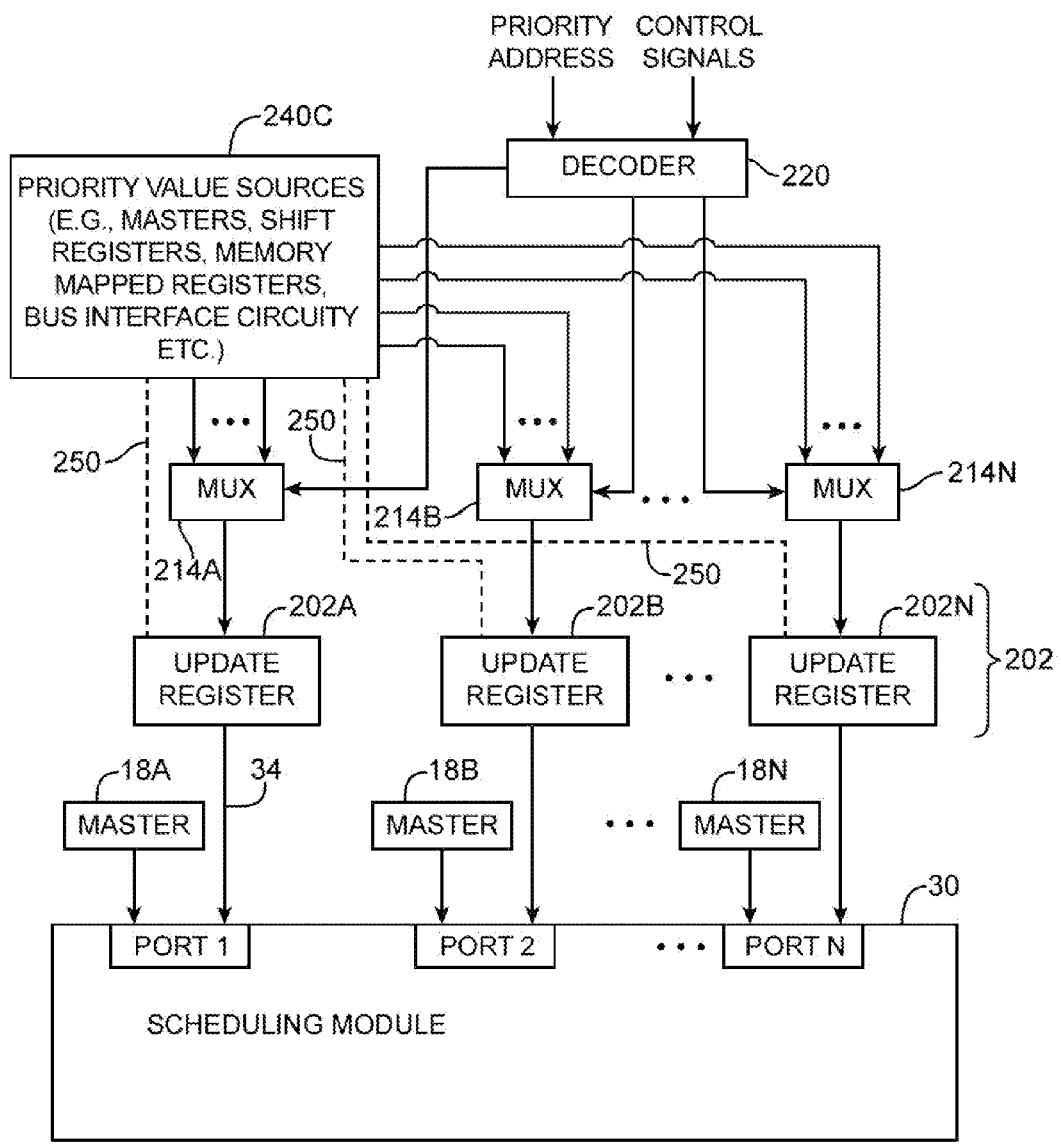
FIG. 6 is a diagram of port priority updating circuitry configured to receive priority values provided using various reconfigurable sources in accordance with an embodiment of the present invention.

The number of priority value sources and the number of masters of FIG. 3, FIG. 4, and FIG. 5 may be selected to accommodate various scenarios. As shown in FIG. 6, many masters (e.g., masters 18A-18N) may be coupled to ports of scheduling module 30 and coupled to priority value update module 32. Each port may have a corresponding update register 202 and multiplexer 214 that provide a priority value from one of priority value sources 240C to the port. For example, port 1 may have a corresponding multiplexer 214A and an update register 202A that identifies the priority value for port 1 (and associated master 18A). Each multiplexer 214 may be coupled to various priority value sources. Each multiplexer may be coupled to any combination of shift registers, bus interfaces, components, masters, or other sources that provide priority values for updating the priority value of the port that is associated with that multiplexer. For example, multiplexer 214A may be coupled to master 18A that dynamically provides priority values with each memory access request, a shift register that provides default priority values, and a memory mapped register that provides user-generated priority values.

Decoder 220 may configure each multiplexer to select one of the various priority value sources. To update the priority value of a given port, decoder 220 may be provided with a priority address that identifies which multiplexer should be configured and control signals that identify which source of that multiplexer should be selected to provide a priority value to a corresponding update register 202. To update the priority value of port 1, decoder 220 may be provided with the priority address associated with multiplexer 214A and control signals (e.g., SEL_MMR, SEL_PORT, and other suitable control signals) to configure multiplexer 214 to select a memory mapped register for providing a priority value to update register 202A (as an example).

As illustrated by dashed lines 250, priority value sources 240C may, if desired, be coupled to update registers 202 using communications paths 250 that do not contain any interposed multiplexers. This type of configuration may be used, for example, in integrated circuit arrangements with only a single priority value source.

Some integrated circuits 10 may require that quality of service (QoS) be provided to masters 18 that access system memory 14. To provide quality of service, memory controller 12 may be required to dynamically reallocate resources to prevent any one master from preventing other masters from accessing system memory. For example, a first master may have a higher priority than a second master. If the first master provides many memory access requests to memory controller 12, memory access requests from the second master may never be fulfilled (i.e., because the requests from the first master are given a higher priority the requests from the second master). By providing a means of updating priority values associated with each master, memory controller 12 may be able to provide quality of service to each of the masters coupled to memory controller 12. For example, the priority of a master that prevents other masters from accessing system memory may be reduced to allow the other masters access to system memory.

Figure 7:
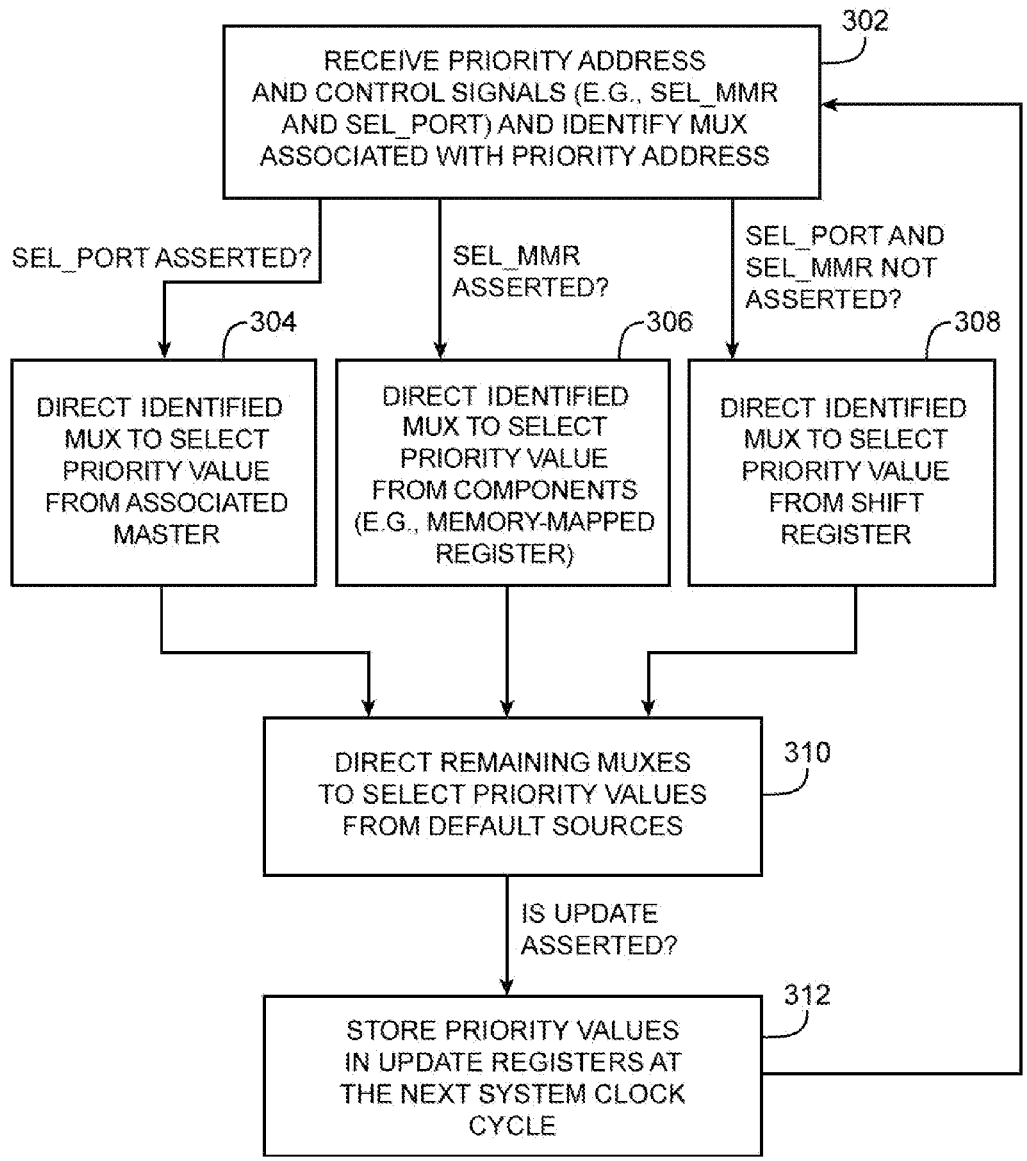
FIG. 7 is a flow chart of illustrative steps involved in assigning desired priority values for each memory controller port in accordance with an embodiment of the present invention.

To update priority values while memory controller 12 fulfills memory access requests, a priority value update module 32 may perform the illustrative steps of the flow chart shown in FIG. 7.

In step 302, priority value update module 32 may receive a priority address and control signals (e.g., a SEL_MMR signal and a SEL_PORT signal) and identify a multiplexer associated with the priority address. For example, priority value update module 32 may receive a priority address "0" and identify that priority address "0" is associated with multiplexer 214B. The identified multiplexer may be associated with a corresponding port or a corresponding master (e.g., multiplexer 214B may be associated with master 18B or port 2). Based on the received control signals, priority value update module 32 may determine whether to perform the operations of step 304, 306, or 308. If the SEL_PORT signal is asserted, priority value update module 32 may perform the operations of step 304. If the SEL_MMR signal is asserted, priority value update module 32 may perform the operations of step 306. If both the SEL_PORT and the SEL_MMR signals are not asserted, priority value update module 32 may perform the operations of step 306. If both the SEL_PORT and the SEL_MMR signals are asserted, priority value update module 32 may ignore the control signals or perform either the operations of step 304, step 306, or step 308.

In step 304, priority value update module 32 may direct the identified multiplexer to select a priority value from a master processing module associated with the identified multiplexer (e.g., a master processing module that provides a priority value to the identified multiplexer). For example, multiplexer 214A may select a priority value provided by master processing module 18A to multiplexer 214A via path 240A. By selecting the priority value, multiplexer 214A may convey the selected priority value to the input of a corresponding update register (e.g., multiplexer 214A may convey the priority value provided by master processing module 18A to the input of update register 202A).

In step 306, priority value update module 32 may direct the identified multiplexer to select a priority value from components such as memory mapped registers, modules coupled to a data bus interface, or other components that provide a single priority value to all of the multiplexers (e.g., the priority value may be provided to each of multiplexers 214A-214N via a single data bus that is coupled to a memory mapped register). The identified multiplexer may convey the selected priority value to the input of a corresponding update register (e.g., multiplexer 214A may convey the priority value provided by a memory mapped register to the input of update register 202A).

In step 308, priority value update module 32 may direct the identified multiplexer to select a priority value from a shift register (or other suitable register located within priority value update module 32) that is associated with the identified multiplexer. For example, multiplexer 214A may select a priority value that is provided by shift register 200A. The identified multiplexer may be configured by priority value update module 32 to convey the selected priority value to the input of a corresponding update register (e.g., multiplexer 214A may convey the priority value provided by shift register 200A to the input of update register 202A).

In step 310, priority value update module 32 may direct the multiplexers not identified by the received priority address (i.e., the remaining multiplexers) to select priority values from default sources. The default sources may be predefined or may be sources that were previously selected in steps 302-308. As an example, shift registers 202 may be predefined as the default sources (i.e., the sources selected by multiplexers that are not identified by the received priority address). In this case, each of the remaining multiplexers may be configured to select a corresponding shift register (e.g., multiplexer 214B may be configured to select a corresponding shift register 214B when the received priority address is not associated with multiplexer 214B). As another example, each multiplexer may be configured to with the source that was most recently selected for that multiplexer in steps 302-308.

Step 310 may be performed concurrently (e.g., at the same time) as step 304. For example, priority value update module 32 that receives a priority address corresponding to a first multiplexer 214A may concurrently select a priority value source for the first multiplexer and the remaining multiplexers.

If an update signal is asserted during the operations of step 310, priority value update module 32 may perform the operations of step 312.

In step 312, priority value update module 32 may store each of the selected priority values in corresponding update registers (e.g., update registers 202) at the next system clock cycle. For example, update register 202A may store a priority value selected by multiplexer 214A. The update signal may be combined with a clock signal so that the selected priority values are stored at the next clock cycle (e.g., the selected priority values may be stored if both the update signal and the clock signal are asserted). The process may then loop back to step 302.

Figure 8:
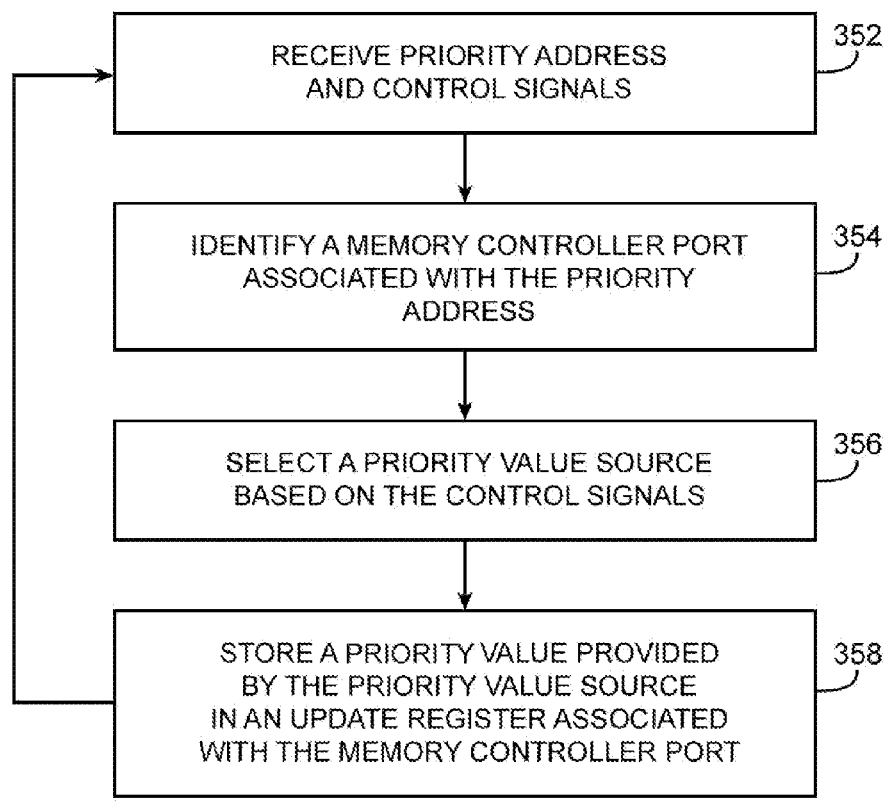
FIG. 8 is a flow chart of illustrative steps involved in updating memory controller port priority values in accordance with an embodiment of the present invention.

It may be desirable to update priority values associated with memory controller ports. To update priority values for specific ports of the memory controller, a priority value update module 32 may perform the illustrative steps of the flow chart shown in FIG. 8.

In step 352, the memory controller may receive a priority address and associated control signals. The priority address and control signals may be provided by a system or other modules of integrated circuit 10.

In step 354, the memory controller may identify a memory controller port associated with the received priority address. For example, priority value update module 32 may use the received priority address to identify one of N different memory controller ports each corresponding to one of N different priority addresses.

In step 356, the memory controller may select a priority value source based on the control signals. There may be various priority value sources (as shown in FIG. 6), and the control signals may identify which of the various priority value sources should be selected to provide a priority value.

In step 358, the memory controller may store a priority value provided by the priority value source in an update register associated with the memory controller port. The priority valued stored in the update register may be used to identify the priority with which memory access requests provided to a port associated with the update register may be fulfilled.

Memory elements of device 10 may be organized in arrays having numerous rows and columns. For example, memory array circuitry may be formed in hundreds or thousands of rows and columns on a programmable logic device integrated circuit. Programmable integrated circuit 10 of FIG. 9 is an example of an illustrative integrated circuit on which memory array circuitry may be formed.

Figure 9:
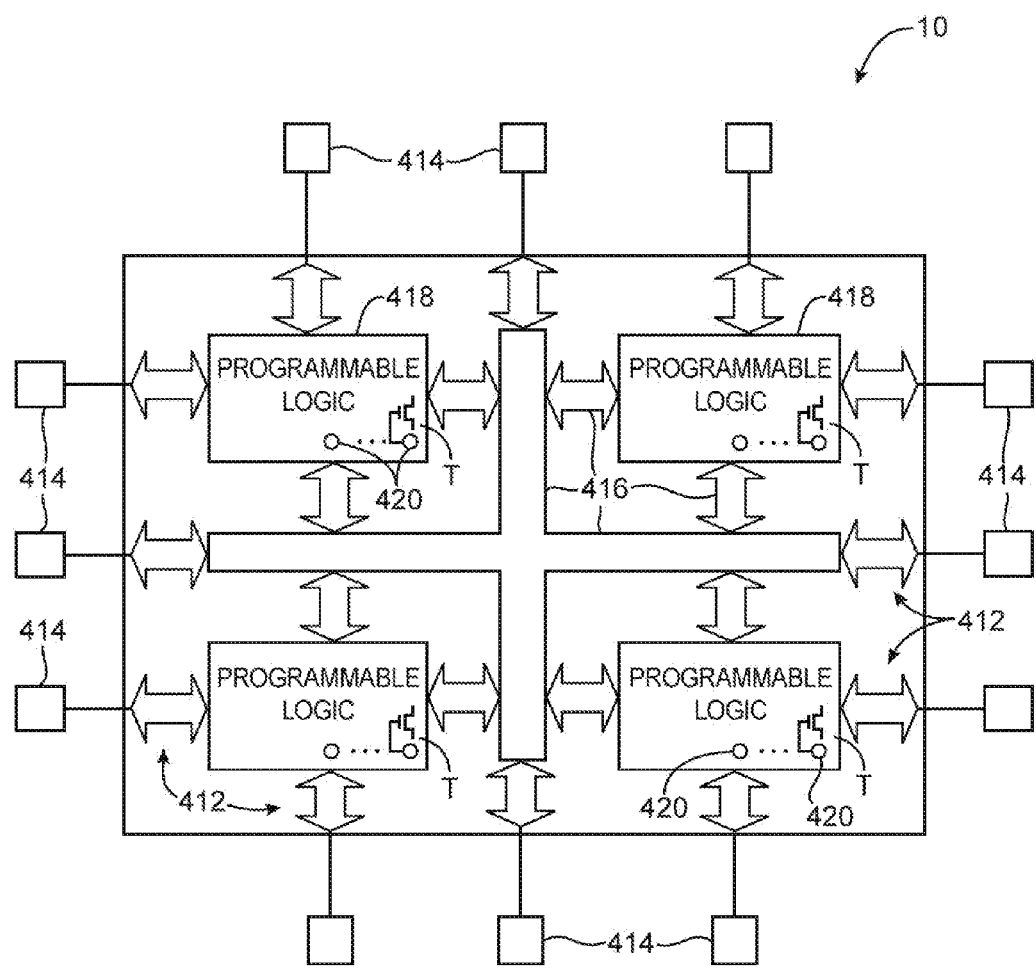
FIG. 9 is a diagram of an illustrative programmable integrated circuit in accordance with an embodiment of the present invention.

As shown in FIG. 9, programmable integrated circuit 10 may have input-output circuitry 412 for driving signals off of device 10 and for receiving signals from other devices via input-output pins 414. Interconnection resources 416 such as global and local vertical and horizontal conductive lines and buses may be used to route signals on device 10. Interconnection resources 416 include fixed interconnects (conductive lines) and programmable interconnects (i.e., programmable connections between respective fixed interconnects). Programmable logic 418 may include combinational and sequential logic circuitry. The programmable logic 18 may be configured to perform a custom logic function.

Programmable integrated circuit 10 contains memory elements 20 that can be loaded with configuration data (also called programming data) using pins 414 and input-output circuitry 412. Once loaded, the memory elements each provide a corresponding static control output signal that controls the state of an associated logic component in programmable logic 418. Typically the memory element output signals are used to control the gates of metal-oxide-semiconductor (MOS) transistors. For example, a port priority update module formed from programmable logic may include memory elements that provide static control output signals to control gates of transistors. In this scenario, the port priority update module may be configured or programmed by storing values into the memory elements that change the static control output signals. Some of the transistors may be p-channel metal-oxide-semiconductor (PMOS) transistors. Many of these transistors may be re-channel metal-oxide-semiconductor (NMOS) pass transistors in programmable components such as multiplexers. When a memory element output is high, an NMOS pass transistor controlled by that memory element will be turned on to pass logic signals from its input to its output. When the memory element output is low, the pass transistor is turned off and does not pass logic signals.

A typical memory element 420 is formed from a number of transistors configured to form cross-coupled inverters. Other arrangements (e.g., cells with more distributed inverter-like circuits) may also be used. With one suitable approach, complementary metal-oxide-semiconductor (CMOS) integrated circuit technology is used to form the memory elements 420, so CMOS-based memory element implementations are described herein as an example. In the context of programmable integrated circuits, the memory elements store configuration data and are therefore sometimes referred to as configuration random-access memory (CRAM) cells.

Figure 10:
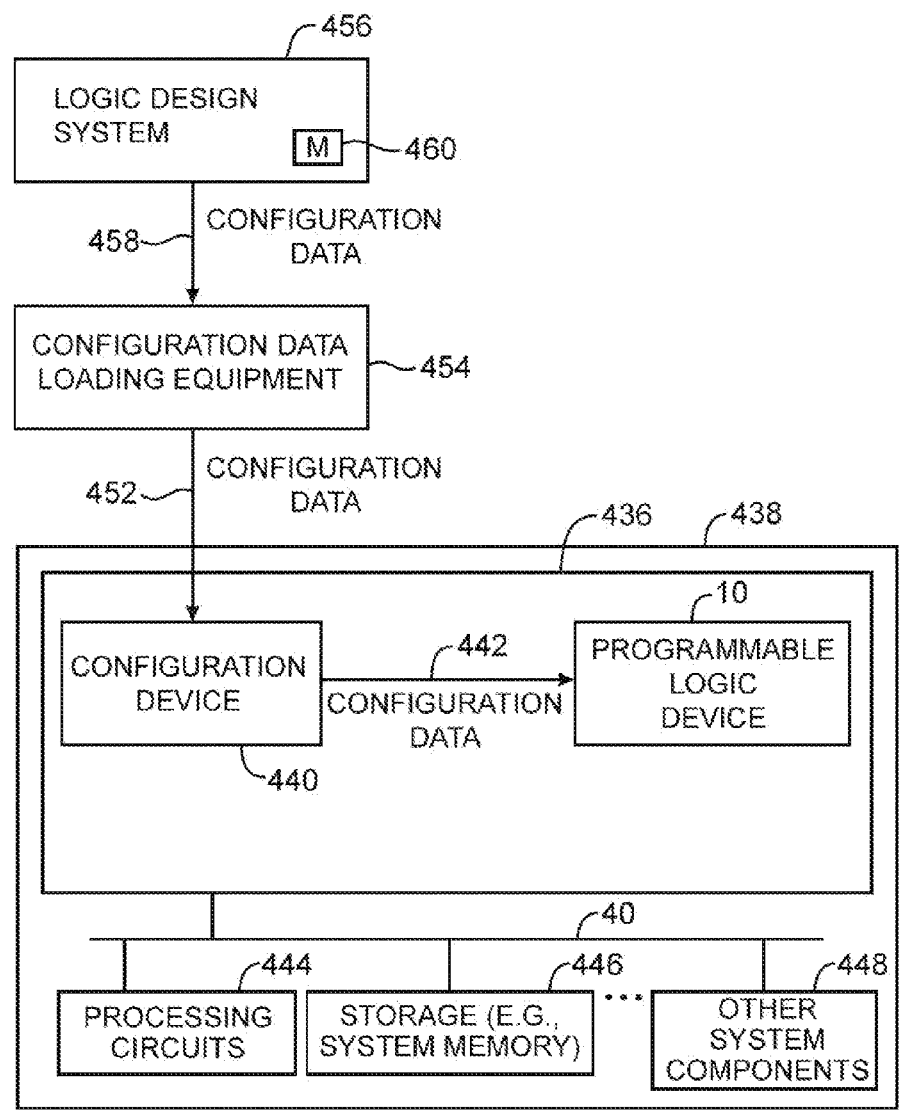
FIG. 10 is a diagram showing how configuration data is created by a logic design system and loaded into a programmable device to configure the device for operation in a system in accordance with an embodiment of the present invention.

An illustrative system environment for device 10 is shown in FIG. 10. Device 10 may be mounted on a board 436 in a system 438. In general, programmable logic device 10 may receive configuration data from programming equipment or from other suitable equipment or device. In the example of FIG. 10, programmable logic device 10 is the type of programmable logic device that receives configuration data from an associated integrated circuit 440. With this type of arrangement, circuit 440 may, if desired, be mounted on the same board 436 as programmable logic device 10. Circuit 440 may be an erasable-programmable read-only memory (EPROM) chip, a programmable logic device configuration data loading chip with built-in memory (sometimes referred to as a configuration device), or other suitable device. When system 438 boots up (or at another suitable time), the configuration data for configuring the programmable logic device may be supplied to the programmable logic device from device 440, as shown schematically by path 442. The configuration data that is supplied to the programmable logic device may be stored in the programmable logic device in its configuration random-access-memory elements 420.

System 438 may include processing circuits 444, storage 446 (e.g., system memory 14), and other system components 448 that communicate with device 10. The components of system 438 may be located on one or more boards such as board 436 or other suitable mounting structures or housings and may be interconnected by buses and other electrical paths 40.

Configuration device 440 may be supplied with the configuration data for device 10 over a path such as path 452. Configuration device 40 may, for example, receive the configuration data from configuration data loading equipment 454 or other suitable equipment that stores this data in configuration device 440. Device 440 may be loaded with data before or after installation on board 436.

It can be a significant undertaking to design and implement a desired logic circuit in a programmable logic device. Logic designers therefore generally use logic design systems based on computer-aided-design (CAD) tools to assist them in designing circuits. A logic design system can help a logic designer design and test complex circuits for a system. When a design is complete, the logic design system may be used to generate configuration data for electrically programming the appropriate programmable logic device.

As shown in FIG. 10, the configuration data produced by a logic design system 456 may be provided to equipment 454 over a path such as path 458. The equipment 454 provides the configuration data to device 440, so that device 440 can later provide this configuration data to the programmable logic device 10 over path 442. System 456 may be based on one or more computers and one or more software programs. In general, software and data may be stored on any computer-readable medium (storage) in system 456 and is shown schematically as storage 460 in FIG. 10.

In a typical scenario, logic design system 456 is used by a logic designer to create a custom circuit design. The system 456 produces corresponding configuration data which is provided to configuration device 440. Upon power-up, configuration device 440 and data loading circuitry on programmable logic device 10 is used to load the configuration data into CRAM cells 420 of device 10. Device 10 may then be used in normal operation of system 438.

The foregoing is merely illustrative of the principles of this invention and various modifications can be made by those skilled in the art without departing from the scope and spirit of the invention.

What is claimed:

1. An integrated circuit that accesses memory, comprising:
   programmable master circuitry that generates memory access requests;
   a memory controller that receives the memory access requests from the programmable master circuitry at first and second ports, wherein the memory controller accesses the memory to fulfill the memory access requests, wherein the memory controller fulfills the memory access requests in an order, wherein the memory controller fulfills the memory access requests by accessing the memory in an order based on priority values;

control circuitry that controls the order in which the memory controller fulfills the memory access requests;

update registers that store the priority values, wherein the update registers are controlled to store the priority values sequentially in respective update registers and during successive clock cycles; and shift register circuitry that provides the priority values to the update registers.

2. The integrated circuit defined in claim 1 wherein the memory controller comprises a non-programmable memory controller.

3. The integrated circuit defined in claim 1 further comprising addressable register circuitry that provides the priority values to the update registers.

4. The integrated circuit defined in claim 1 further comprising priority value sources that supply the priority values to the update registers.

5. The integrated circuit defined in claim 4 wherein each of the memory access requests is associated with one of the priority values and wherein the integrated circuit further comprises at least one priority value source that supplies the update registers with the priority values and further supplies the first and second ports of the memory controller with the memory access requests.

6. The integrated circuit defined in claim 5 wherein the at least one priority value source comprises at least one master processing module that dynamically supplies the priority values to the update registers.

7. The integrated circuit defined in claim 6 wherein the at least one master processing module further supplies the first and second ports of the memory controller with the memory access requests while supplying the priority values.

8. An integrated circuit, comprising:
processing circuitry that generates memory access requests for accessing a memory, wherein the processing circuitry comprises at least one memory element that produces a static output signal that configures the processing circuitry to generate the memory access requests and at least one
programmable transistor having a gate that receives the static output signal;
a non-reconfigurable memory controller that receives the memory access requests at a plurality of ports each of which has an associated priority value;
programmable control circuitry that dynamically adjusts the priority value associated with each of the plurality of ports, wherein the non-reconfigurable memory controller fulfills the memory access requests by accessing the memory in an order based on the priority values;
a plurality of priority value sources that supply at least one of the priority values; and
update registers that store and provide the priority values to the non-reconfigurable memory controller, wherein the programmable control circuitry comprises:
multiplexer circuitry coupled between the update registers and the plurality of priority value sources;
and a decoder that controls the multiplexer circuitry to route the priority value from a selected priority value source to a selected port of the non-reconfigurable memory controller, wherein the decoder selects the priority values from default
priority value sources for non-selected ports of the non-reconfigurable memory controller.

9. The integrated circuit defined in claim 8 wherein the decoder comprises a priority address input that receives a priority address, wherein the decoder controls the multiplexer circuitry based on the priority address.

10. The integrated circuit defined in claim 9 wherein the multiplexer circuitry comprises a plurality of multiplexers each of which is coupled to the decoder by a respective control line and each of which selectively routes signals from the plurality of priority value sources to a respective one of the update registers.

11. The integrated circuit defined in claim 8 wherein the plurality of ports comprise a first port and a second port, wherein the processing circuitry comprises a first master processing circuit that transmits memory access requests to the first port and a second master processing circuit that transmits memory access requests to the second port, and wherein the programmable control circuitry also provides quality of service to the first master processing circuit and the second master processing circuit by dynamically adjusting the priority values.

12. The integrated circuit defined in claim 8 wherein the priority value sources comprise at least one priority value source selected from the group consisting of: a master processing module, a shift register, a memory mapped register, and a bus interface.

13. An integrated circuit, comprising:
a plurality of processing modules that produce memory access requests;
a memory controller that receives the memory access requests, and that accesses a memory to fulfill the memory access requests in an order based on memory access priority information, wherein the memory access priority information comprises respective values corresponding to each of the processing modules, and wherein at least two of the respective values can be synchronously adjusted without powering down the memory controller; and
programmable circuitry that provides the memory access priority information to the memory controller based on configuration data stored by programmable memory elements in the programmable circuitry.

14. The integrated circuit defined in claim 13 wherein the memory access priority information comprises a plurality of memory access priority values, and wherein the programmable circuitry comprises update register circuitry that stores at least one of the memory access priority values.

15. The integrated circuit defined in claim 14 further comprising:
a plurality of priority value sources each of which supplies memory access priority values, wherein the programmable circuitry further comprises multiplexer circuitry that routes a selected memory access priority value supplied by a selected one of the plurality of priority value sources to the update register circuitry.

16. The integrated circuit device defined in claim 13 further comprising at least one source of the memory access priority information selected from the group consisting of: a master processing module, a shift register, a memory mapped register, and a bus interface, wherein the programmable circuitry receives the memory access priority information from the at least one source of the memory access priority information and selects which memory access priority information to provide to the memory controller.

* * * * *